United States Patent
Al-Alem et al.

(10) Patent No.: US 12,032,453 B2
(45) Date of Patent: Jul. 9, 2024

(54) SYSTEMS AND METHODS FOR BACKUP AND RESTORE OF CONTAINER-BASED PERSISTENT VOLUMES

(71) Applicant: EMC IP Holding Company LLC, Hopkinton, MA (US)

(72) Inventors: Luay Al-Alem, Lynnfield, MA (US); Antony Bett, Shrewsbury, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 564 days.

(21) Appl. No.: 16/599,752

(22) Filed: Oct. 11, 2019

(65) Prior Publication Data
US 2021/0109822 A1 Apr. 15, 2021

(51) Int. Cl.
*G06F 16/215* (2019.01)
*G06F 11/14* (2006.01)

(52) U.S. Cl.
CPC ...... *G06F 11/1469* (2013.01); *G06F 11/1453* (2013.01); *G06F 11/1464* (2013.01); *G06F 16/215* (2019.01); *G06F 2201/84* (2013.01)

(58) Field of Classification Search
CPC .............................. G06F 11/14; G06F 16/215
See application file for complete search history.

(56) References Cited

U.S. PATENT DOCUMENTS

| | | | | |
|---|---|---|---|---|
| 9,652,616 | B1 * | 5/2017 | Bhatkar | G06F 21/566 |
| 10,013,189 | B1 * | 7/2018 | Yang | G06F 3/0619 |
| 10,169,571 | B1 * | 1/2019 | Attfield | G06F 21/62 |
| 10,402,090 | B1 * | 9/2019 | Tsaur | G06F 3/067 |
| 2007/0162359 | A1 * | 7/2007 | Gokhale | G06Q 10/087 705/28 |
| 2009/0198389 | A1 * | 8/2009 | Kirchhof-Falter | G06F 9/4887 701/1 |
| 2011/0161419 | A1 * | 6/2011 | Chunilal | H04L 51/14 709/204 |
| 2012/0204193 | A1 * | 8/2012 | Nethercutt | G06F 11/3466 719/330 |
| 2015/0149659 | A1 * | 5/2015 | Emadzadeh | G06F 16/1744 709/247 |
| 2016/0112407 | A1 * | 4/2016 | Nara | G06F 3/067 726/5 |
| 2017/0235641 | A1 * | 8/2017 | Ancel | G06F 11/1458 707/654 |

(Continued)

*Primary Examiner* — Maher N Algibhah
(74) *Attorney, Agent, or Firm* — WOMBLE BOND DICKINSON (US) LLP (57) ABSTRACT

Methods and systems for backing up and restoring data on a worker node are described. According to some embodiments, the method includes using a job controller to spin up one or more backup jobs in the worker node. The method further includes utilizing, by the backup jobs, mount propagation to access one or more persistent volumes of a pod on the worker node. The method further includes performing, by the backup jobs, backup tasks on the persistent volumes. The method further includes applying a set of rules used by a scheduler to determine a location of the pod in order to ensure the backup jobs are scheduled on a same worker node. The method further includes storing, by the backup jobs, backup artifacts generated by the backup tasks, wherein the backup artifacts include deduplicated data.

20 Claims, 8 Drawing Sheets

(56) References Cited

U.S. PATENT DOCUMENTS

| | | | |
|---|---|---|---|
| 2017/0235647 A1* | 8/2017 | Kilaru | G06F 11/1464 |
| | | | 707/652 |
| 2017/0262347 A1* | 9/2017 | Dornemann | G06F 9/45558 |
| 2019/0324861 A1* | 10/2019 | Stowell | G06F 11/1469 |
| 2019/0373316 A1* | 12/2019 | Yu | H04N 21/6125 |
| 2020/0112487 A1* | 4/2020 | Inamdar | H04L 67/56 |
| 2020/0311137 A1* | 10/2020 | Gupta | G06F 16/14 |
| 2021/0109822 A1* | 4/2021 | Al-Alem | G06F 16/215 |

* cited by examiner

SYSTEMS AND METHODS FOR BACKUP AND RESTORE OF CONTAINER-BASED PERSISTENT VOLUMES

FIELD OF THE INVENTION

Embodiments of the present disclosure relate generally to data storage systems. More particularly, embodiments of the invention relate to systems and methods for backup and restore of container-based persistent volumes.

BACKGROUND

Most traditional data protection systems require an agent to be installed alongside the applications and registered with a data protection server to perform backup and restore operations. In a containerized system for automating application deployment, scaling, and management (e.g., Kubernetes), a job refers to a supervisor for pods carrying out batch processes, that is, a process that runs for a certain time to completion, for example a calculation or a backup operation. A pod refers to a group of containers that are deployed together on the same host.

In general, a job creates one or more pods and ensures that a specified number of pods successfully terminates. As pods successfully complete, the job tracks the successful completions. When a specified number of successful completions is reached, the job itself is complete. Deleting a job will clean up the pods it created. A simple case, for example, is to create one job object in order to reliably run one pod to completion. The job object will start a new pod if the first pod fails or is deleted (for example due to a node hardware failure or a node reboot). A job can also be used to run multiple pods in parallel.

In a containerized environment, backup and restore tasks need a dynamic and efficient mechanism to access pod volumes for backup and restore operations. However, such environment is dynamic and pods often get rescheduled to a different node (e.g., due to node failure, network partition, etc.). Therefore, there is a need for a data protection system that automatically adapts to pods rescheduling in order to protect applications in such dynamic environment.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Methods and systems for backing up and restoring data on a worker node are described.

According to some embodiments, the method includes using a job controller to spin up one or more backup jobs in the worker node. The method further includes utilizing, by the backup jobs, mount propagation to access one or more persistent volumes of a pod on the worker node. The method further includes performing, by the backup jobs, backup tasks on the persistent volumes. The method further includes applying a set of rules used by a scheduler to determine a location of the pod in order to ensure the backup jobs are scheduled on a same worker node. The method further includes storing, by the backup jobs, backup artifacts generated by the backup tasks, wherein the backup artifacts include deduplicated data.

According to some embodiments, the method includes using a job controller to spin up one or more restore jobs in the worker node. The method further includes utilizing, by the restore jobs, mount propagation to access one or more persistent volumes of a pod on the worker node. The method further includes applying a set of rules used by a scheduler to determine a location of the pod in order to ensure the restore jobs are scheduled on a same worker node. The method further includes retrieving, by the restore jobs, backup artifacts. The method further includes performing, by the restore jobs, restore tasks on the persistent volumes based on the retrieved backup artifacts.

Figure 1A:
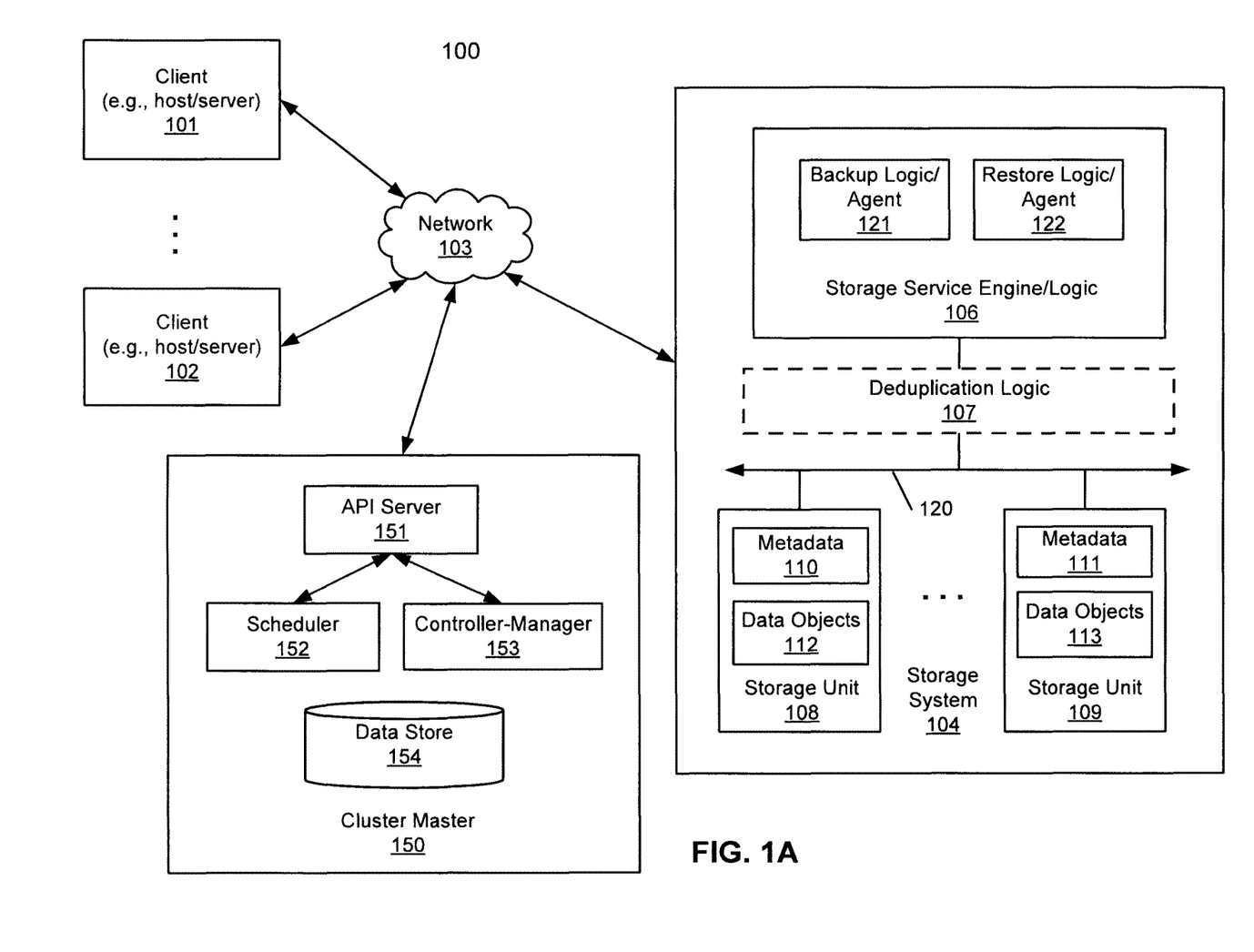
FIG. 1A is a block diagram illustrating a storage system according to one embodiment.

FIG. 1A is a block diagram illustrating a storage system according to one embodiment of the invention. Referring to FIG. 1A, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic or agent 121 is configured to receive and back up data from a client (e.g., clients 101-102) and to store the backup data in any one or more of storage units 108-109. Restore logic or agent 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks), for example as data objects 112-113, according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

With continued reference to FIG. 1A, system 100 may further include a cluster master 150 (e.g., kubernetes master) that decides what runs on a cluster's worker nodes (e.g., clients 101-102). That is, cluster master 150 may serve as an access point (or a control plane) from which administrators and other users can interact with the cluster to manage the scheduling and deployment of containers (as described in more detail herein below). For example, cluster master 150 may store the state and configuration data for the entire cluster in data store 154. In one embodiment, data store 154 may be a persistent and distributed key-value data store (e.g., etcd).

In one embodiment, cluster master 150 includes an application programming interface (API) server 151, a scheduler 152, a controller-manager 153, and data store 154. API server 151 serves as a gateway to a cluster (e.g., kubernetes cluster), which may include cluster master 150 and clients 101-102 as worker nodes. That is, API server 151 may be the central touch point that is accessed by users, automation, and components in the cluster. In one embodiment, API server 151 implements a representational state transfer (REST) API over HTTP, performs all API operations, and is responsible for storing API objects into a persistent storage backend (e.g., data store 154).

In one embodiment, scheduler 152 manages and tracks node workloads in the cluster. For example, scheduler 152 may keep track of the capacity and resources of nodes (described in more detailed herein below) and assigns work to nodes based on the availability of the nodes.

In one embodiment, controller-manager 153 (e.g., kube-controller-manager) handles control loops that manage the state of the cluster via API server 151. For example, controller-manager 153 may handle controls of deployments, replicas, and nodes (e.g., registering a node and monitoring its health throughout the node's lifecycle).

Figure 1B:
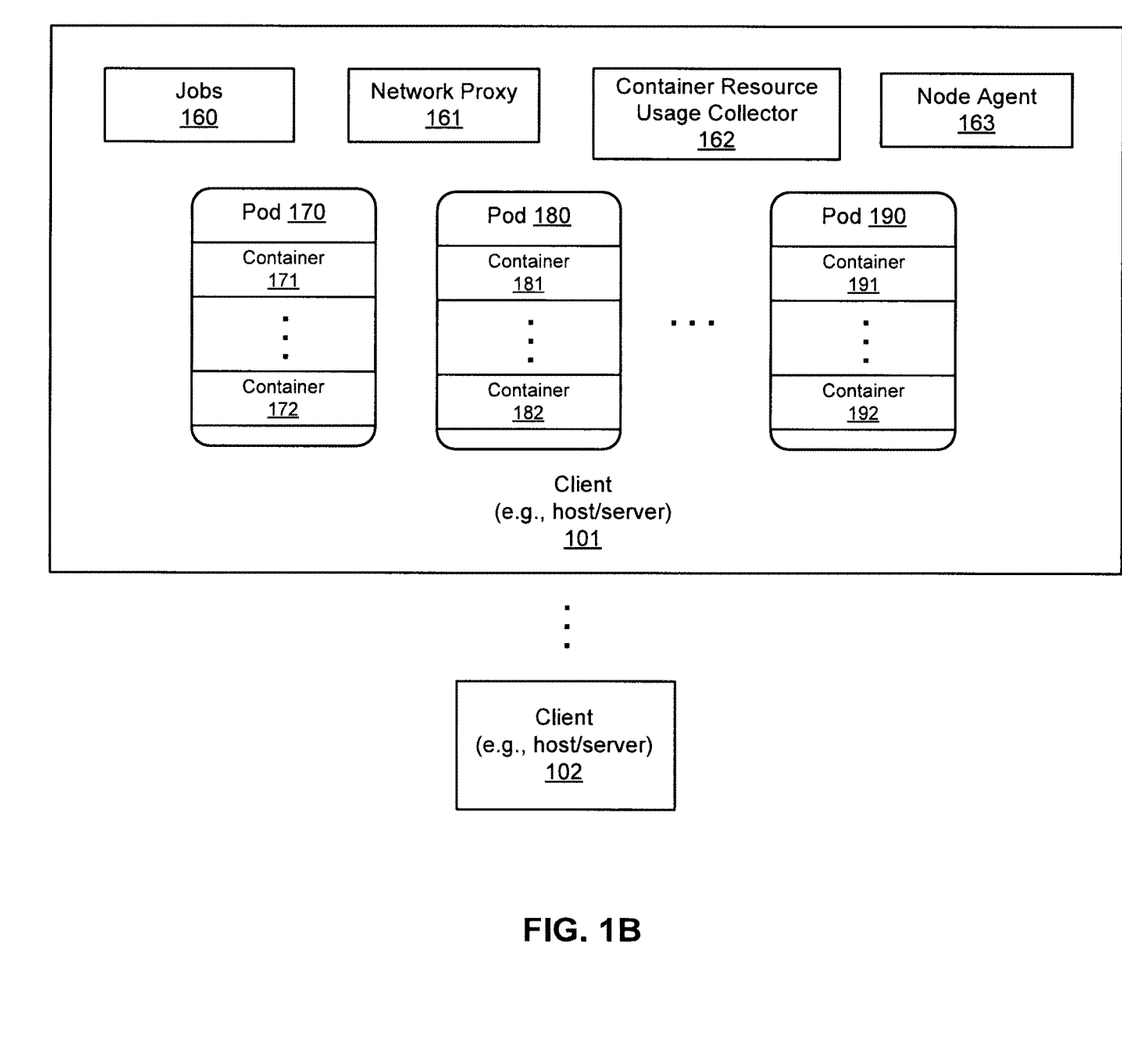
FIG. 1B is a diagram illustrating an example client according to one embodiment.

Referring now to FIG. 1B, which is a diagram illustrating an example client according to one embodiment, each of clients 101-102 may serve as a worker node in a containerized or container-orchestration system. In one embodiment, each of clients 101-102 may include jobs 160, network proxy 161 (e.g., kube-proxy), container resource usage collector 162 (e.g., cAdvisor), node agent 163 (e.g., kubelet), and a multiplicity of pods 170, 180, 190.

Jobs 160 are responsible for creating and maintaining pods 170-190. A pod refers to a basic scheduling unit. A job creates one or more pods (e.g., pods 170-190) and ensures that a specified number of pods successfully terminate. As shown, pods 170-190 may consist of one or more containers 171-172, 181-182 and 191-192 respectively. The containers (e.g., containers 171-172) may be co-located on a host machine (e.g., client 101/102) and can share resources. As pods successfully complete, the job tracks the successful completions. When a specified number of successful completions is reached, the job is also complete. Accordingly, deleting a job will clean up the pods the job created. For example, a simple case is to create one job object in order to reliably run one pod to completion. The job object will start a new pod if the first pod fails or is deleted (e.g., due to a node hardware failure or a node reboot). A job can also be used to run multiple pods in parallel. In one embodiment, jobs 160 may utilize mount propagation to gain read and write access to a pod persistent volume on client 101/102 for processing backup and restore operations on client 101/102 without the need to have an agent running alongside the pod to perform such operations. Mount propagation allows for sharing volumes mounted by a container to other containers in the same pod, or even to other pods on the same worker node. Mount propagation may be set to one of the following values:

None—This volume mount will not receive any subsequent mounts that are mounted to this volume or any of its subdirectories by the host. In similar fashion, no mounts created by the container will be visible on the host.

HostToContainer—This volume mount will receive all subsequent mounts that are mounted to this volume or any of its subdirectories. If the host mounts anything inside the volume mount, the container will see it mounted there.

Bidirectional—This volume mount behaves the same as the HostToContainer mount. In addition, all volume mounts created by the container will be propagated back to the host and to all containers of all pods that use the same volume.

In some embodiments, HostToContainer and Bidirectional values provide the capabilities to run read and write operations against a pod volume. Since the pod volume is a map to a file or directory on the host filesystem, containers or pods running on the same host that share the volume also receive any subsequent changes to that volume.

In one embodiment, network proxy 161 runs on clients 101-102 (as worker nodes) in a cluster. Network proxy 161 may operate as a load balancer for services running on a node (e.g., client 101/102).

In one embodiment, container resource usage collector 162 provides container users an understanding of the resource usage and performance characteristics of their running containers (e.g., containers 171-172). Collector 162 may run a daemon that collects, aggregates, processes, and exports information about the running containers.

In one embodiment, node agent 163 runs pods 170-190 and ensures containers (e.g., containers 171-172) are running in each pod. Node agent 163 may register a worker node (i.e., client 101/102) with API server 151 using, for example, one of: a hostname, a flag to override the hostname, or a specific logic for a cloud provider.

Figure 2:
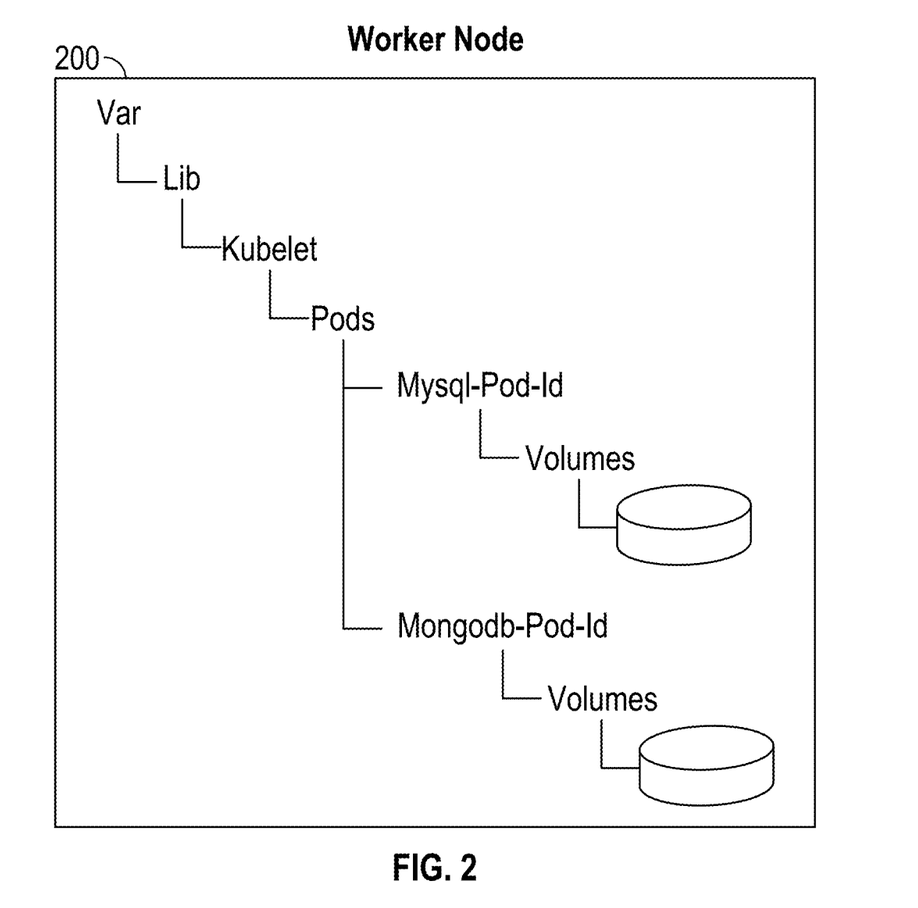
FIG. 2 is a diagram illustrating an example worker node according to one embodiment.

Referring now to FIG. 2 (which is a diagram illustrating an example worker node according to one embodiment), in a Kubernetes environment, for example, there is a standard path where pod persistent volumes are mapped as files or directories on the filesystem of worker node 200 (e.g., client 101/102 of FIG. 1A). Typically, the filesystem path for the pod persistent volumes is "/var/lib/kubelet/pods/podID/volumes" where a pod identifier (ID) is the unique ID of the pod that is consuming a specific persistent volume. A volume that is mounted by a container can be shared by another container via mount propagation. As previously described, mount propagation allows for sharing volumes mounted by a container to other containers in the same pod, or even to other pods on the same node (e.g., worker node 200). Container may need to share volumes for various reasons such as logging, sharing configuration information across containers, storing secrets, etc. Since mount propagation allows sharing of volumes across containers, it can be suited to a process that needs short lived access to a pod's volume for backup purposes. This process can be implemented by a job controller (e.g., controller-manager 153 of FIG. 1A) that spins up a job which mounts a pod's persistent volume and perform backup or restore operation on that persistent volume. That is, one embodiment, backup logic 121 and restore logic 122 of FIG. 1A may communicate with controller-manager 153 to spin up jobs that mount a pod's persistent volume to perform backup and restore operations, respectively, on the persistent volume.

Figure 3:
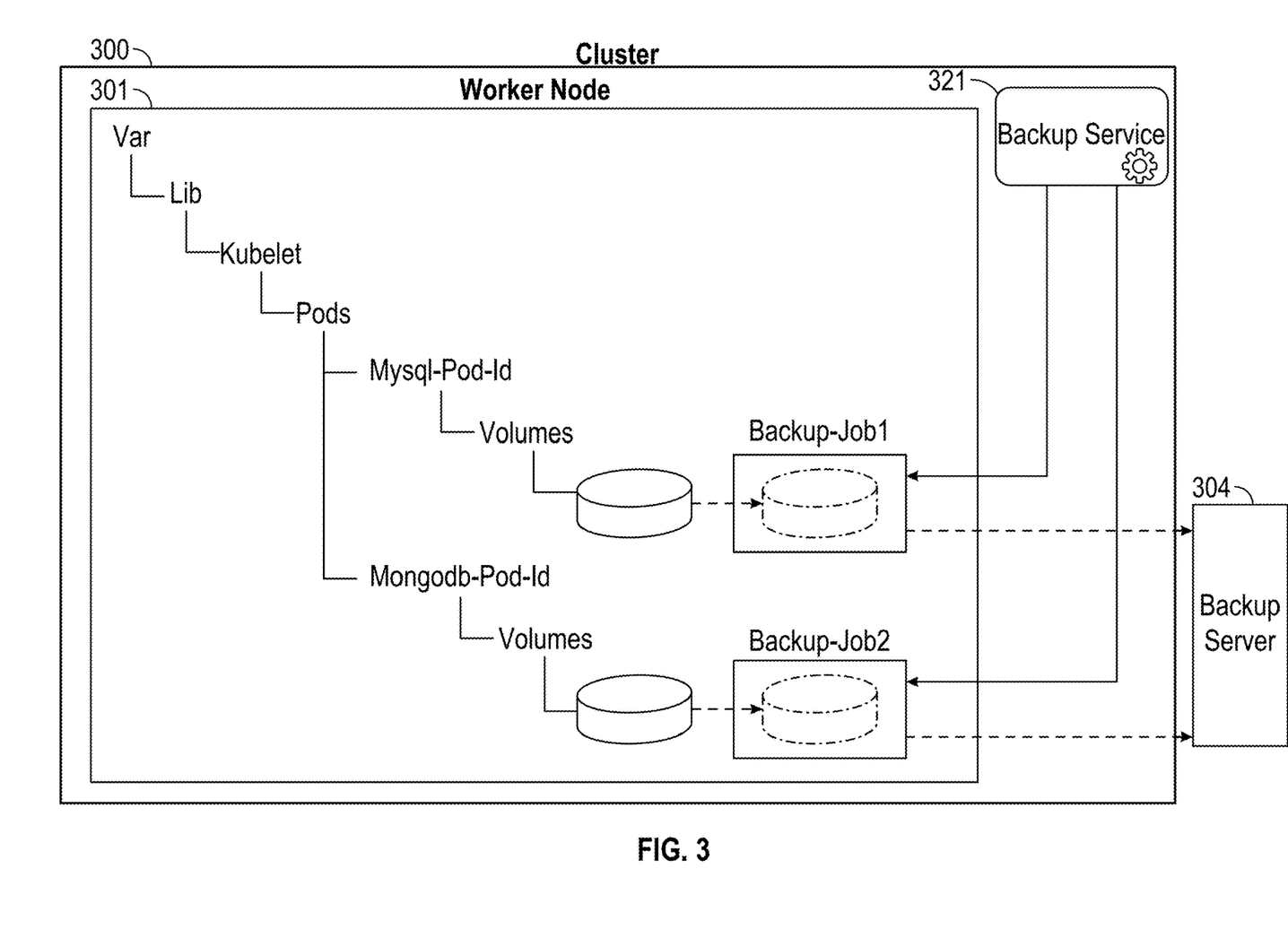
FIG. 3 is a diagram illustrating a storage system having a backup service according to one embodiment.

FIG. 3 is a diagram illustrating a storage system having a backup service according to one embodiment. In FIG. 3, the storage system may include a cluster 300 and backup server 304. In one embodiment, backup server 304 may represent storage system 104 of FIG. 1A. As shown, cluster 300 may include a worker node 301 (e.g., client 101/102 of FIG. 1A) and backup service 321. Backup service 321 may be implemented as part of cluster master 150 of FIG. 1A or server 304. In one embodiment, backup service 321 may use or invoke a job controller (e.g., controller-manager 153) to spin up or execute one or more backup jobs (referred to as backup-job1 and backup-job2 as an example) in worker node 301. The backup jobs (which may be jobs 160 of FIG. 1B) may utilize mount propagation to access pod persistent volumes on worker node 301 and perform backup tasks on the target pod volumes. In one embodiment, backup service 321 may use a set of rules used by a scheduler (e.g., scheduler 152) to determine where a pod can be placed (e.g., node affinity). The rules may be defined using custom labels on nodes and label sectors specified in pods. In this way, backup service 321 can ensure that backup jobs are scheduled on the same node (e.g., worker node 301) where the pod is running. This ensures the backup jobs have access to the same volumes as the pod. As previously described, HostToContainer and Bidirectional values in mount propagation provide the capabilities to run read and write operations against a pod volume. Since the pod volume is a map to a file or directory on the host filesystem, containers or pods running on the same host that share the volume also receive any subsequent changes to that volume.

In one embodiment, backup jobs may send backup artifacts to backup server 304 for storing the backup artifacts on server 304. In one embodiment, the stored backup artifacts may include deduplicated data or a unique instance of data, logging information, configuration information across containers, storing secrets, etc. In this way, data deduplication is performed on worker node 301 prior to transmitting to server 304, thereby providing an efficient backup data transmission. In one embodiment, the backup jobs may include pre-hooks and post-hooks for the backup tasks. The pre-hooks and post-hooks may provide a mechanism to run specific commands to ensure data consistency prior to executing the backup tasks. For example, the pre-hooks may be used to freeze the file system prior to performing the backup tasks and post-hooks may be used to unfreeze the file system after performing the backup tasks.

Upon completion of the backup jobs, backup service 321 may collect metadata and store the metadata in server 304 for analytics. Subsequently, the backup jobs may be cleaned up, thereby cleaning up the pods the backup jobs created.

Figure 4:
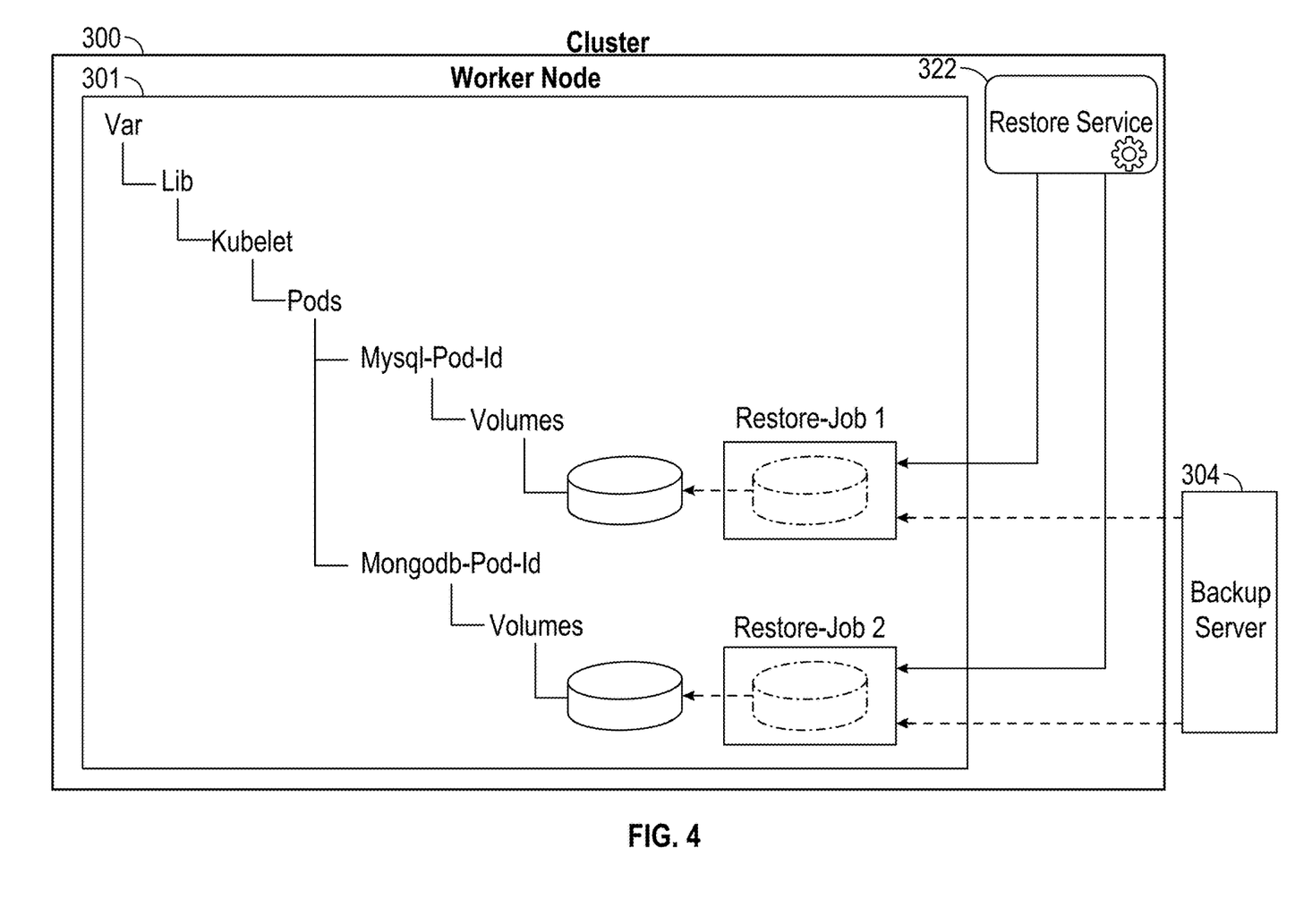
FIG. 4 is a diagram illustrating a storage system having a restore service according to one embodiment.

FIG. 4 is a diagram illustrating a storage system having a restore service according to one embodiment. In FIG. 4, the storage system may include cluster 300 and backup server 304 (as previously described). In one embodiment, backup server 304 may represent storage system 104 of FIG. 1A. As shown, cluster 300 may include a worker node 301 (e.g., client 101/102 of FIG. 1A) and restore service 322. Restore service 322 may be implemented as part of cluster master 150 of FIG. 1A or server 304. In one embodiment, restore service 322 may use or invoke a job controller (e.g., controller-manager 153) to spin up or execute one or more restore jobs (referred to as restore-job1 and restore-job2 as an example) in worker node 301. The restore jobs (which may be jobs 160 of FIG. 1B) may utilize mount propagation to access pod persistent volumes on worker node 301 and perform restore tasks on the target pod volumes. In one embodiment, restore service 322 may use or apply a set of rules used by a scheduler (e.g., scheduler 152) to determine a location where a pod can be placed (e.g., node affinity). The rules may be defined using custom labels on nodes and label sectors specified in pods. In this way, restore service 322 can ensure that restore jobs are scheduled on the same node (e.g., worker node 301) where the pod is running. This ensures the restore jobs have access to the same volumes as the pod.

In one embodiment, restore jobs may retrieve backup artifacts from server 304, for example, from storage units of server 304 (e.g., storage units 108-109 of FIG. 1A). Using the retrieved backup artifacts (which include deduplicated data) and mount propagation (as previously described), restore jobs may perform restore tasks on one or more pod persistent volumes in order to restore the volumes to a previous state. In one embodiment, the restore jobs may include pre-hooks and post-hooks for the restore tasks. The pre-hooks and post-hooks may provide a mechanism to run specific commands to ensure data consistency prior to executing the restore tasks. For example, the pre-hooks may be used to freeze the file system prior to performing the restore tasks and post-hooks may be used to unfreeze the file system after performing the restore tasks.

Upon completion of the restore jobs, restore service 322 may collect metadata that can be used for analytics. The metadata may be stored on server 304. Subsequently, the restore jobs may be cleaned up, thereby cleaning up the pods the restore jobs created.

Figure 5:
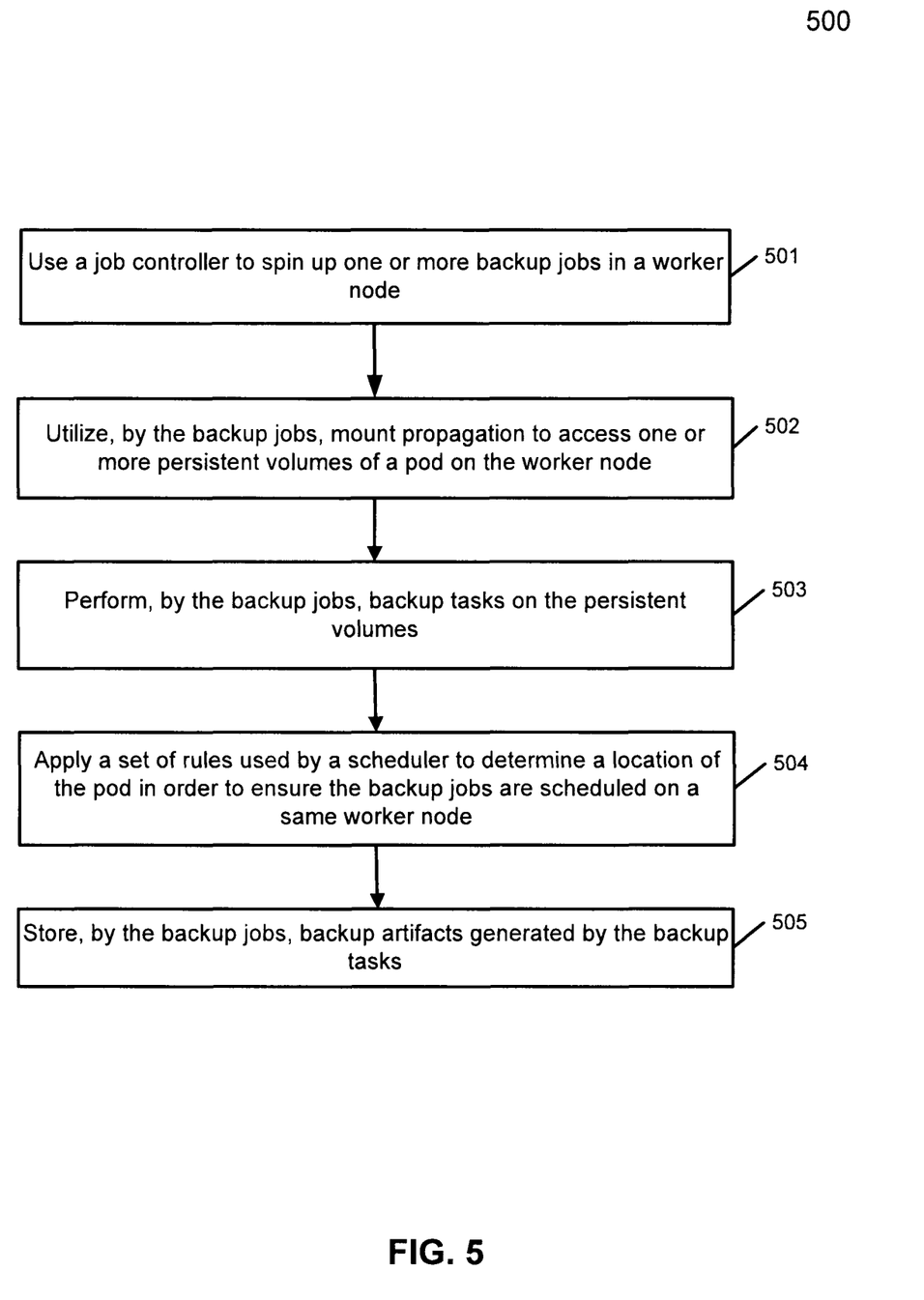
FIG. 5 is a flow diagram illustrating a method of backing up a pod persistent volume according to one embodiment.

FIG. 5 is a flow diagram illustrating a method of backing up a pod persistent volume according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by cluster master 150, any of clients 101-102, or a combination thereof.

Referring to FIG. 5, at block 501, the processing logic uses a job controller (e.g., controller-manager 153) to spin up one or more backup jobs in a worker node (e.g., client 101/102). At block 502, the backup jobs utilize mount propagation to access one or more persistent volume of a pod on the worker node. At block 503, the backup jobs perform backup tasks on the persistent volumes. At block 504, the processing logic applies a set of rules used by a scheduler (e.g., scheduler 152) to determine a location of the pod (e.g., node affinity) in order to ensure the backup jobs are scheduled on a same worker node. At block 505, the processing logic stores backup artifacts (e.g., deduplicated data, logging information, configuration information across containers, storing secrets, etc.) generated by the backup tasks, for example, on storage system 104 of FIG. 1A.

Figure 6:
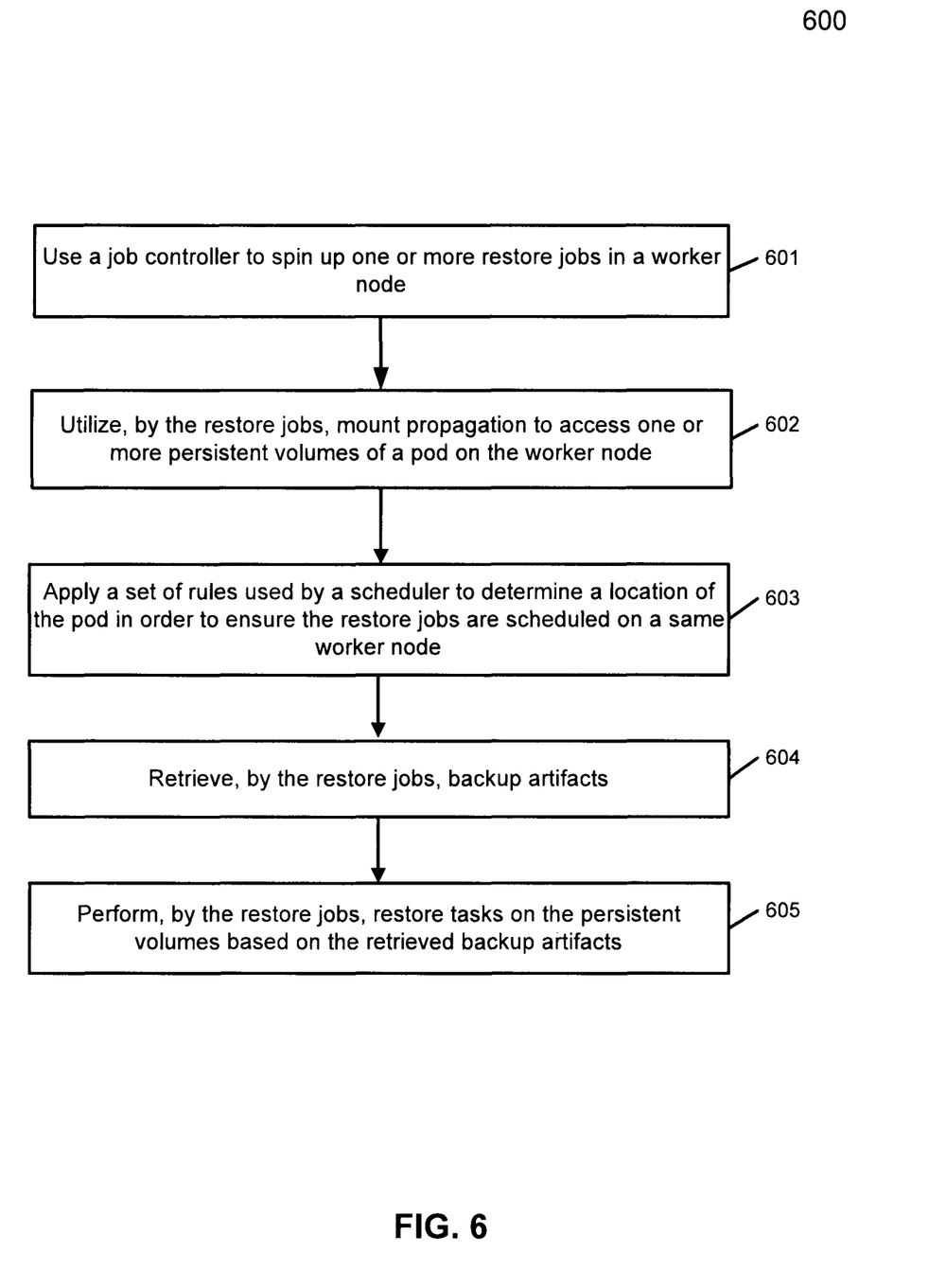
FIG. 6 is a flow diagram illustrating a method of restoring a pod persistent volume according to one embodiment.

FIG. 6 is a flow diagram illustrating a method of restoring a pod persistent volume according to one embodiment. Process 600 may be performed by processing logic that includes hardware (e.g. circuitry, dedicated logic, etc.), software (e.g., embodied on a non-transitory computer readable medium), or a combination thereof. For example, process 600 may be performed by cluster master 150, any of clients 101-102, or a combination thereof.

Referring to FIG. 6, at block 601, the processing logic uses a job controller (e.g., controller-manager 153) to spin up one or more restore jobs in a worker node (e.g., client 101/102). At block 602, the restore jobs utilize mount propagation to access one or more persistent volume of a pod on the worker node. At block 603, the processing logic applies a set of rules used by a scheduler (e.g., scheduler 152) to determine a location of the pod (e.g., node affinity) in order to ensure the restore jobs are scheduled on a same worker node. At block 604, the processing logic retrieves backup artifacts (e.g., deduplicated data, logging information, configuration information across containers, storing secrets, etc.), for example, from a storage system, such as system 104 of FIG. 1A. At block 605, the restore jobs perform restore tasks on the persistent volumes of the pod based on the retrieved backup artifacts.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
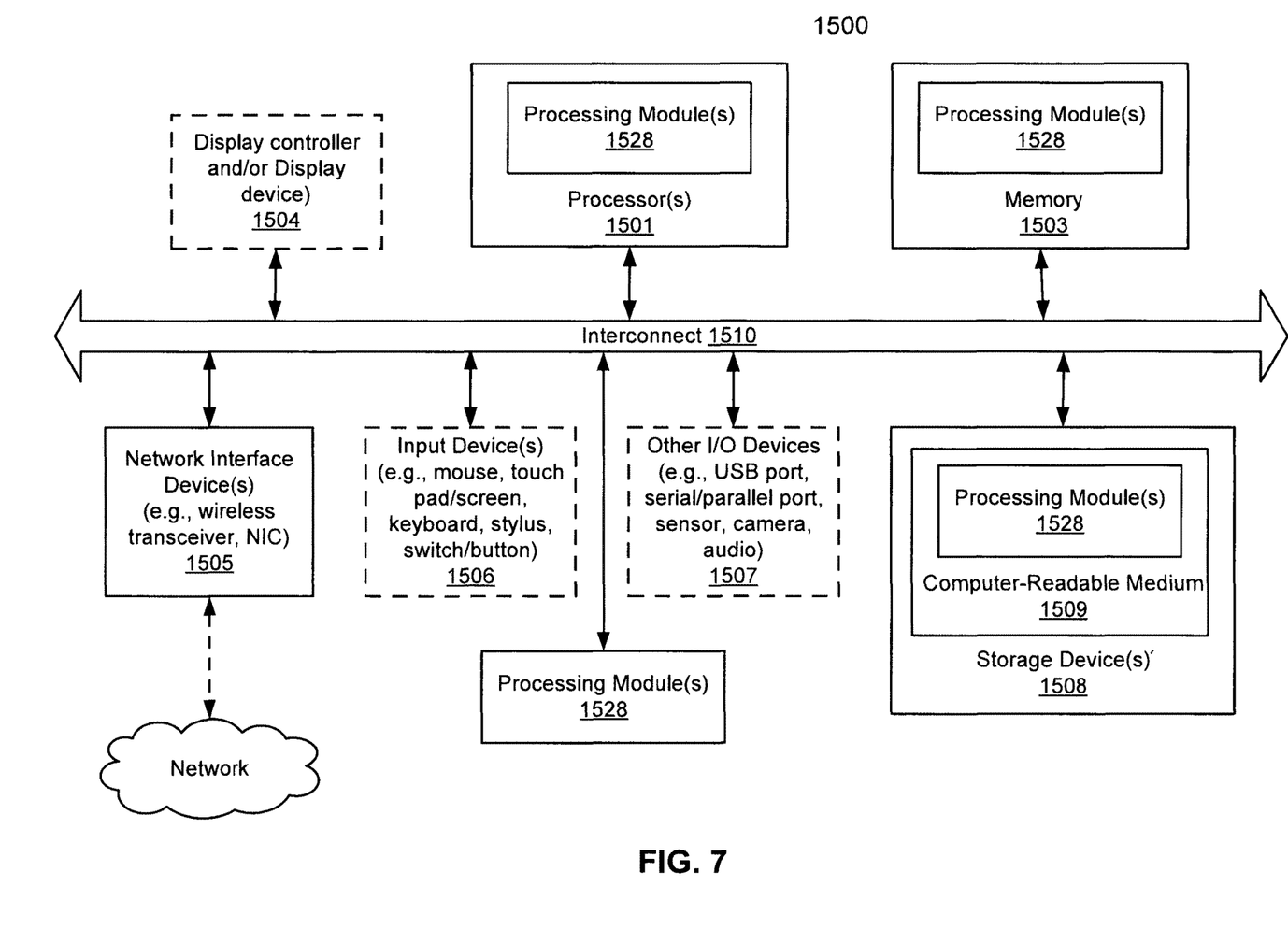
FIG. 7 is a block diagram illustrating a data processing system according to one embodiment.

FIG. 7 is a block diagram illustrating an example of a data processing system which may be used with one embodiment. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, modules 151-153 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of backing up data on a worker node among a plurality of worker nodes, comprising:
using a job controller to spin up one or more backup jobs in the worker node;
utilizing, by the backup jobs, mount propagation to access one or more persistent volumes of a pod, among a plurality of pods, on the worker node;
performing, by the backup jobs, backup tasks on the persistent volumes of the pod;
applying a set of rules used by a scheduler to determine a location of the pod to ensure the backup jobs are scheduled on a same worker node where the pod is running, wherein the set of rules is defined based on custom labels on the plurality of worker nodes and label sectors specified in the plurality of pods; and
storing, by the backup jobs, backup artifacts generated by the backup tasks, wherein the backup artifacts include deduplicated data, wherein, prior to performing the backup tasks on the persistent volumes of the pod, the method further includes:
using pre-hooks to freeze a file system of the worker node, wherein the persistent volumes are mapped on the file system of the worker node; and
cleaning up the backup jobs based on reaching a specified number of successful completions.

2. The method of claim 1, further comprising:
after performing the backup tasks on the persistent volumes of the pod, unfreezing the file system of the worker node.

3. The method of claim 2, further comprising:
collecting metadata associated with the backup tasks performed on the persistent volumes.

4. The method of claim 1, further comprising: prior to storing the backup artifacts generated by the backup tasks, sending the backup artifacts to a data server to store the backup artifacts.

5. The method of claim 1, wherein a value of the mount propagation is HostToContainer or Bidirectional.

6. The method of claim 1, wherein the job controller is a kube-controller-manager.

7. The method of claim 1, wherein the set of rules used by the scheduler is node affinity.

8. The method of claim 1, wherein the backup artifacts further include logging information, configuration information across containers consisted in the pod, and storing secrets.

9. A computer-implemented method of restoring data on a worker node among a plurality of worker nodes, comprising:
using a job controller to spin up one or more restore jobs in the worker node;
utilizing, by the restore jobs, mount propagation to access one or more persistent volumes of a pod, among a plurality of pods, on the worker node;
applying a set of rules used by a scheduler to determine a location of the pod to ensure the restore jobs are scheduled on a same worker node where the pod is running, wherein the set of rules is defined based on custom labels on the plurality of worker nodes and label sectors specified in the plurality of pods;
retrieving, by the restore jobs, backup artifacts; and performing, by the restore jobs, restore tasks on the persistent volumes of the pod based on the retrieved backup artifacts, wherein prior to performing the restore tasks on the persistent volumes of the pod, the method includes:

using pre-hooks to freeze a file system of the worker node, wherein the persistent volumes are mapped on the file system of the worker node; and cleaning up the restore jobs based on reaching a specified number of successful completions.

10. The method of claim 9, further comprising:
after performing the restore tasks on the persistent volumes of the pod, unfreezing the file system of the worker node.

11. The method of claim 10, further comprising:
collecting metadata associated with the restore tasks performed on the persistent volumes.

12. The method of claim 9, wherein the backup artifacts are retrieved from a data server.

13. The method of claim 9, wherein a value of the mount propagation is HostToContainer or Bidirectional.

14. The method of claim 9, wherein the job controller is a kube-controller-manager.

15. The method of claim 9, wherein the set of rules used by the scheduler is node affinity.

16. The method of claim 9, wherein the backup artifacts include deduplicated data, logging information, configuration information across containers consisted in the pod, and storing secrets associated with the persistent volumes.

17. A non-transitory machine-readable medium having instructions stored therein, which when executed by a processor, cause the processor to perform operations, the operations comprising:

using a job controller to spin up one or more backup jobs in a worker node among a plurality of worker nodes;

utilizing, by the backup jobs, mount propagation to access one or more persistent volumes of a pod, among a plurality of pods, on the worker node;

performing, by the backup jobs, backup tasks on the persistent volumes of the pod;

applying a set of rules used by a scheduler to determine a location of the pod to ensure the backup jobs are scheduled on a same worker node where the pod is running, wherein the set of rules is defined based on custom labels on the plurality of worker nodes and label sectors specified in the plurality of pods; and storing, by the backup jobs, backup artifacts generated by the backup tasks, wherein the backup artifacts include deduplicated data, wherein, prior to performing the backup tasks on the persistent volumes of the pod, the operations further comprising:

using pre-hooks to freeze a file system of the worker node, wherein the persistent volumes are mapped on the file system of the worker node; and cleaning up the backup jobs based on reaching a specified number of successful completions.

18. A data processing system, comprising:
a processor; and
a memory coupled to the processor to store instructions, which when executed by the processor, cause the processor to perform operations, the operations including:

using a job controller to spin up one or more backup jobs in a worker node among a plurality of worker nodes;

utilizing, by the backup jobs, mount propagation to access one or more persistent volumes of a pod, among a plurality of pods, on the worker node;

performing, by the backup jobs, backup tasks on the persistent volumes of the pod;

applying a set of rules used by a scheduler to determine a location of the pod to ensure the backup jobs are scheduled on a same worker node where the pod is running, wherein the set of rules is defined based on custom labels on the plurality of worker nodes and label sectors specified in the plurality of pods; and storing, by the backup jobs, backup artifacts generated by the backup tasks, wherein the backup artifacts include deduplicated data, wherein, prior to performing the backup tasks on the persistent volumes of the pod, the operations further comprising:

using pre-hooks to freeze a file system of the worker node, wherein the persistent volumes are mapped on the file system of the worker node; and cleaning up the backup jobs based on reaching a specified number of successful completions.

19. A non-transitory machine-readable medium having instructions stored therein, which when executed by a processor, cause the processor to perform operations, the operations comprising:

using a job controller to spin up one or more restore jobs in a worker node among a plurality of worker nodes;

utilizing, by the restore jobs, mount propagation to access one or more persistent volumes of a pod, among a plurality of pods, on the worker node;

applying a set of rules used by a scheduler to determine a location of the pod to ensure the restore jobs are scheduled on a same worker node where the pod is running, wherein the set of rules is defined based on custom labels on the plurality of worker nodes and label sectors specified in the plurality of pods;

retrieving, by the restore jobs, backup artifacts; and performing, by the restore jobs, restore tasks on the persistent volumes of the pod based on the retrieved backup artifacts, wherein prior to performing the restore tasks on the persistent volumes of the pod, the operations further comprising:

using pre-hooks to freeze a file system of the worker node, wherein the persistent volumes are mapped on the file system of the worker node; and cleaning up the restore jobs based on reaching a specified number of successful completions.

20. A data processing system, comprising:
a processor; and
a memory coupled to the processor to store instructions, which when executed by the processor, cause the processor to perform operations, the operations including:

using a job controller to spin up one or more restore jobs in a worker node among a plurality of worker nodes;

utilizing, by the restore jobs, mount propagation to access one or more persistent volumes of a pod, among a plurality of pods, on the worker node;

applying a set of rules used by a scheduler to determine a location of the pod to ensure the restore jobs are scheduled on a same worker node where the pod is running, wherein the set of rules is defined based on custom labels on the plurality of worker nodes and label sectors specified in the plurality of pods;

retrieving, by the restore jobs, backup artifacts; and performing, by the restore jobs, restore tasks on the persistent volumes of the pod based on the retrieved backup artifacts, wherein prior to performing the restore tasks on the persistent volumes of the pod, the operations further comprising:
using pre-hooks to freeze a file system of the worker node, wherein the persistent volumes are mapped on the file system of the worker node; and
cleaning up the restore jobs based on reaching a specified number of successful completions.

\* \* \* \* \*

UNITED STATES PATENT AND TRADEMARK OFFICE
CERTIFICATE OF CORRECTION

| | | |
|---|---|---|
| PATENT NO. | : 12,032,453 B2 | Page 1 of 1 |
| APPLICATION NO. | : 16/599752 | |
| DATED | : July 9, 2024 | |
| INVENTOR(S) | : Al-Alem et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 615 days.

Signed and Sealed this
Eighteenth Day of March, 2025

Coke Morgan Stewart
*Acting Director of the United States Patent and Trademark Office*